United States Patent
Kanellopoulos et al.

(10) Patent No.: US 6,797,790 B1
(45) Date of Patent: Sep. 28, 2004

(54) POLYMERIC COMPOSITION FOR FRICTION ELEMENTS

(75) Inventors: Vasilios Kanellopoulos, Troinex (CH); Isabelle Louis-Joseph-Dogue, Nagano (JP); Vincent Daniel McGinniss, Sunbury, OH (US); Duryodhan Mangaraj, Dublin, OH (US); Tomoki Tsuchiy Nakamura, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/048,884

(22) PCT Filed: Jul. 27, 2000

(86) PCT No.: PCT/IB00/01033

§ 371 (c)(1),
(2), (4) Date: Apr. 23, 2002

(87) PCT Pub. No.: WO01/10935

PCT Pub. Date: Feb. 15, 2001

(30) Foreign Application Priority Data

Aug. 4, 1999 (EP) ............................................ 99810697

(51) Int. Cl.⁷ ............................................... C08L 83/06
(52) U.S. Cl. ........................... 525/474; 528/29; 528/18; 525/487; 525/393
(58) Field of Search ................................ 525/474, 393, 525/487; 528/29, 18, 487

(56) References Cited

U.S. PATENT DOCUMENTS 3,911,045 A   10/1975  Hartmann et al.
4,657,951 A   4/1987   Takarada
5,864,000 A * 1/1999   Lightbody et al.

FOREIGN PATENT DOCUMENTS

| DE | 16 94 974 | 8/1971 |
|---|---|---|
| EP | 0 456 490 | 11/1991 |
| EP | 0 934 967 | 8/1999 |
| EP | 1 074 573 | * 2/2001 |
| JP | 63251452 | 10/1988 |
| WO | WO 96 33238 | 10/1996 |
| WO | WO 97 19977 | 6/1997 |

* cited by examiner

Primary Examiner—Kuo-Liang Peng
(74) Attorney, Agent, or Firm—Sturm & Fix LLP

(57) ABSTRACT

The polymeric composition for friction elements comprises a co-polymer between (I) a resin containing phenolic groups and a reticulation agent, and (II) an organopolysiloxane resin containing terminal silanol groups. A part at least of the phenolic groups is bound to the terminal silanol groups. A process of the preparation of the above polymeric composition may comprise the following steps: a) mixing (I) a resin containing the phenolic groups and the reticulation agent, (II) containing the terminal silanol groups, and (III) an epoxy resin or the epoxidisesd organopolysiloxane; b) curing the mixture for a period of time sufficient to complete substantially the reaction between the phenolic groups and the terminal silanol groups, c) post-heating the product obtained under b).

20 Claims, No Drawings

POLYMERIC COMPOSITION FOR FRICTION ELEMENTS

BACKGROUND OF THE INVENTION

1. Field of the Invention

The invention is concerned with a polymeric composition for friction elements having remarkable properties with regard to temperature and contact with water. Although the invention will be described in more details with relation to brake pad or brake linings, it should be understood that it may be used in any application in which friction properties have to remain stable with increasing temperature and under wet conditions, such as brakes and clutches for vehicles and machine tools. The brake pad is one example in which heat and water are of a prime importance due to a possible overheating if the braking action is applied for an extended period of time, during which moreover water may come in contact with the pads.

2. Description of the Prior Art

Preparations or compositions for friction elements for use in brake pads and other applications are known. One example is a mixture in which a phenolic resin and an organopolysiloxane or silicone resin are mixed with a crosslinking agent as described for instance in EP-0 456 490 and JP-63-251 452.

In the former document a catalyst is used during the preparation, which consists of an organic compound conventionally used in the manufacturing of silicone rubber, such as stannous oleate and tin naphtenate.

U.S. Pat. No. 4,657,951 is citing other organic metallic salts which can be employed as catalysts in the transesterification between a phenolic resin and an organopolysiloxane. Tetrabutyl titanate, tetra isopropyl titanate and butyl polytitanate are mentioned among others. Zirconates are also known as catalysts for transesterification.

However, according to IR analysis, this mixture appears to be basically a simple mixture of the original phenolic resin and the product of the homoreaction between the silicone resin and itself. This means in particular that the reaction involved do not lead to specific interactions of the phenolic hydroxy groups with the silicone, most of the phenolic groups remaining as such, i.e. as free phenolic groups. Hydrophilic properties are therefore retained together with a relatively high capacity of water absorption, which in turn is affecting strongly the friction characteristics of the product.

In our co-pending unpublished European patent application no 98420024,6, an improved polymeric composition for friction elements is disclosed, which comprises a co-polymer between (I) a resin containing phenolic groups and (II) an organopolysiloxane resin or silicone containing terminal silanol groups, a part of the phenolic groups being bound to the terminal silanol groups. Preferably, the reaction between (I) and (II) is made in the presence of an epoxy resin or an epoxidised organopolysiloxane.

BRIEF SUMMARY OF THE INVENTION

As in the above document, the object of the invention is also to make the reaction between a phenolic resin and an organopolysiloxane or silicone resin follow a different way, resulting in a actual co-reaction or condensation between the phenolic groups and the silanols groups of the silicone in Si—O—C and C—O—C bonds. A part at least of the free phenolic groups of the starting phenolic are consumed in such bonds and will not longer be available for water absorption. The reaction product will loose its hydrophilic properties and the water which may come in contact with said product will not be absorbed, yielding a composition with improved friction properties even under wet conditions.

DETAILED DESCRIPTION OF THE INVENTION

An object of the invention is products which exhibit still improved properties over the products just mentioned above in the unpublished European Patent Application.

Another object of the invention is to prepare a composition with superior heat resistance.

Another object of the invention is to prepare a composition with improved wet conditions performance.

In other words, the invention relates to a polymeric composition for friction elements, comprising a co-polymer between (I) a resin containing phenolic groups, (II) an organopolysiloxane resin or silicone containing terminal silanol groups and (III) a reticulation agent, a part at least of the phenolic groups being bound to the terminal silanol groups, wherein tris neoalkalanate titanate is used as a catalyst for the co-polymerisation reaction.

Preferably, the resin containing phenolic groups is from 50 to 80% and the organopolysiloxane resin containing terminal silanol groups is from 8 to 25% by weight of the total starting mixture.

The starting resin comprising phenolic groups may also comprise terminal non aromatic alcoholic groups, a part at least of the terminal non aromatic alcoholic groups being also bound to the terminal silanol groups.

The reticulation agent may be an amine such as an hexamine, preferably to the extend of 8 to 12% by weight.

In one embodiment, the resin containing phenolic groups is of the general formula (A) and may include moieties of a general formula (A').

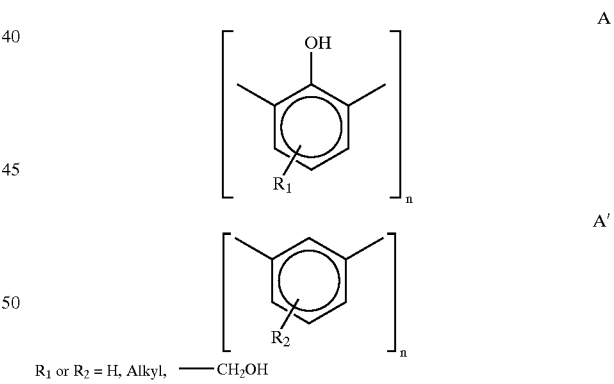

$R_1$ or $R_2$ = H, Alkyl, ——$CH_2OH$

A typical convenient resin is for instance a phenyl aralkyl resin in which $R_1$ is —$CH_2$—φ— having a basic structure of alternated moieties A/A'. A variety of such resins are sold under the generic name of ®Xylok by Mitsui Toatsu Chemical, Japan.

The other compound, namely an organopolysiloxane resin containing terminal silanol groups may be for instance a diphenyl silicone or an hydroxy phenyl alkyl silicone resin or methyphenylsiloxane.

Among tris neoalkalanate titanates, those neoalkalanates having between 2 and 16 C atoms on each chain, saturated or unsaturated, unbranched or branched, are preferred.

These titanates may contain hetero-atoms atoms or heterocyclic moieties.

Examples of convenient catalysts within the above definition are:
neopentyl(diallyl)oxy tridecanoyl titanate,
neopentyl(diallyl)oxy tri(didecyl)benzenesulfonyl titanate,
neopentyl(diallyl)oxy tri(dioctyl)phosphato titanate,
neopentyl(diallyl)oxy tri(dioctyl)pyrophosphate titanate,
their adducts with acrylate and methacrylate functional amines,
neopentyl(diallyl)oxy tri(N-ethylenediamino)ethyl titanate,
neopentyl(diallyl)oxy tri(m-amino)phenyl titanate,
neopentyl(diallyl)oxy trihydroxy caproyl titanate,
all sold by Kenrich Petrochemical under the general name of ®Lica. A preferred catalyst is neopentyl(diallyl)oxy trineodecanonyl titanate.

The invention relates as well to a process for the preparation of the polymeric composition, comprising the following steps:

a) mixing and kneading together (I) a resin containing the phenolic groups with (II) a resin containing the terminal silanol groups, in the presence of a tris neoalkalanate titanate as a catalyst, for a period of time sufficient to substantially complete the reaction between the phenolic groups and the terminal silanol groups, to yield a paste, b) cooling down the paste until obtaining a solid, c) grinding the solid into a powder, d) adding the reticulation agent to said powder, e) curing the above mixture, f) post-curing the product obtained under e).

In the above processes, the catalyst tris neoalkanate titanate is preferably used in quantities comprised between 1 and 2% by weight of the total mixture.

If the co-polymerisation reaction is conducted in solution, then the catalyst may be present in higher quantities, preferably between 1 and 18% by weight of the total mixture.

Due to the high efficiency of the reaction in condensing the phenolic groups with the terminal silanol groups, such a reaction may be described as "end capping".

The silicone resin is present in the starting mixture from 8 to 25% by weight, preferably around 10 to 20%. Si 6-2230 (a diphenylsilicone) of ®Dow Corning Silicone, Z-6018 (an other diphenyl silicone) of ®Dow Corning or PDS 9931 (an other diphenyl silicone) of ®Gelest Inc. are examples of such silicone resins.

To make easier the blending of the starting resins, said resins are preferably in a form of powder with a particle size distribution of not more than 400 µm, preferably below 300 µm for a compound such as ®Xylok cited above, and 200 µm for silicone.

The mixing and kneading under step a) of the resins and the catalsyt, said catalyst having the consistency of honey, is preferably conducted in a vessel at a temperature of 80 to 135° C. under a nitrogen pressure of 1 to 2 atm. This is easily carried out in a kneading machine with a rotation speed between 30 and 80 rpm.

The paste obtained above is then cooled or chilled down, for instance simply by leaving it at room temperature for a sufficient period of time. When solid, it is ground to yield a powder with a particle size distribution advantageously between 10 and 200 µm.

The hexamine is then added and throughoutly mixed to the powder, and the mixture is cured at a temperature between 50 to 200° C., for instance around 170–180° C., under a pressure of 250 to 320 atm.

In general, the curing step is divided in a number of cycles (5 to 20 cycles for instance) permitting the degassing of the reaction mixture.

As to the post-curing, the haeting temperature is advantageously from 190 to 240° C.

The various objects and advantages of the invention will become apparent with regard to the following non limitative examples.

EXAMPLES 1 TO 3

From a starting blend containing a silicone resin of different types according to the examples, a ®Xylok free of reticulation agent (available by Mitsui Chemicals, Japan), and 1,4% of neopentyl(diallyl)oxy trineodecanonyl titanate (®Lica-01 of Kenrich Petrochemicals), samples of the following table 1 were fabricated using the parameters given above and in the following additional conditions:

10 degassing cycles with a pressure of 300 atm (6 seconds on, 4 seconds off) at 175° C.

Post-curing during 10 minutes at 200° C.

TABLE 1

| Example | Compositions | |
|---|---|---|
| 1 | Si-62230 | 24.25% |
|   | Xylok | 74.35% |
|   | Lica-01 | 1.4% |
| 2 | Z-6018 | 19.5% |
|   | Xylok | 79.1% |
|   | Lica-01 | 1.4% |
| 3 | PDS 9931 | 20.0% |
|   | Xylok | 78.6% |
|   | Lica-01 | 1.4% |

Specimens of theses formulations were used as a substrate or binder to be processed into a "simplified" brake pad sample with a minimum number of ingredients, to form specific formulations for water tests. "Simplified" brake pad is intended to designate a model or simulation probe for tests traditionally made by using a simplified mix of 4 components only, whereas an actual brake pad for vehicles is a more complex mixture of over 15 ingredients.

The water absorption was tested using a method, where a 10 µl water drop is deposited at the surface of the sample and the time for absorption is recorded. On a ®Teflon surface, which was used as a reference, a 10 µl drop disappeared in 60 minutes.

The droplet on a pad surface having a composition corresponding to example 1 disappeared in 60 minutes when said pad has not been heated, and in 57 minutes when the pad has been submitted to a heating cycle at 350° C. during 1 hr. These values indicate no water affinity, very near to that of ®Teflon, and an excellent resistance to heating and overheating.

COMPARATIVE EXAMPLE

By way of comparison, a comparative formulation corresponding to examples 1,2 and 3 was made by the same procedure, but without using the silicone resin and the catalyst, in order to demonstrate the effect of the "end capping". All formulations of examples 1 to 3 and of the comparative example were submitted to a heat treatment simulating heating and over-heating due to a braking action. A temperature of 350° C. was used for 1 hr and 2 hr receptively. Results of the above "droples" tests, expressed in minutes, are given below in Table 2:

TABLE 2

|  | 1 | 2 | 3 | comparative formulation |
|---|---|---|---|---|
| non heated | 66 | 64 | 60 | 37 |
| heated 350° C./1 h | 57 | 54 | 45 | 12 |
| heated 350° C./2 hr | 16 | 14 | 17 | 8 |

Conclusions are clear. Formulations of examples 1 to 3 are far superior to the comparative formulation prepared without the tris neoalkalanate titanate catalyst. Times to absorb water are at least twice as much. The peak of almost 5 times (57, resp. 54, resp. 48 vs 12) for a heat treatment of 1 hr is of a prime importance, since it is a more realistic time for an excessive braking action (descending under full load conditions).

Another comparison between Example 1 and the same comparative formulation is given below in Table 3. This time, test samples are actual brake pads using all the traditional ingredients.

TABLE 3

|  |  | example 1 | comparative formulation |
|---|---|---|---|
| Water absorption in minutes | non heated | 40 | 44 |
|  | heated 350° C./1 hr | 35 | 28 |
|  | heated 350° C./2 hr | 17 | 9 |
| Bending strength in kgf/mm$^2$ | non heated | 3.87 | 3.99 |
|  | heated 350° C./1 hr | 2.15 | 1.41 |
|  | heated 350° C./2 hr | 1.80 | 1.12 |

Again resistance to water and mechanical properties, although comparable before heat treatment, are far better after heat treatment.

EXAMPLES 4 AND 5

The following products of examples 4 and 5 were prepared in solution as follows:

Ex. 4: 3/7 of ®Xylok, 3/7 of silicone resin Si 62230 and 1/7 of neopentyl(diallyl)oxy tridecanoyl titanate (®Lica-01) as a catalyst by weight were mixed for 2 hr at 155–160° C.

Ex. 5: 3/7 ®Xylok, 3/7 of silicone resin Z-6018 and 1/7 of neopentyl(dialtyl)oxy tridecanoyl titanate (®Lica-01) as a catalyst by weight were mixed for 2 hr at 155–160° C.

COMPARATIVE EXAMPLES

For comparison purposes, the following products were prepared in solution in DMF, as described above:

Comp. Ex 4: ®Xylok (3/7 by weight), silicone resin Si 62230 (3/7 by weight) and tetra isopropyl titanate (1/7 by weight) of the art (as mentioned above) as a catalyst by weight were mixed during 2 hr at 155–160° C. Tetra isopropyl titanate was ®Tysor R TPT made by ®DuPont Chemicals.

Comp. Ex. 5: ®Xylok (3/7 by weight), silicone resin Z-6018 (3/7 by weight) and tetra isopropyl titanate (1/7 by weight) of the art as a catalyst by weight were mixed during 2 hr at 155–160° C. Tetra isopropyl titanate was also ®Tysor R TPT made by ®DuPont Chemicals.

All above products of examples 4 and 5, and of the comparative examples, were examined by ultra violet spectroscopy after addition of a small amount of KOH in order to ionise the phenolic groups, which show absorption at 280 and 275 nm. Results are given below, in Table 4.

TABLE 4

| examples | 280 nm | 275 nm |
|---|---|---|
| 4 | no peak | no peak |
| 5 | no peak | no peak |
| Comparative 4 | 1.84 | 1.94 |
| Comparative 5 | 2.24 | 2.27 |

As seen from Table 4, the products made with the tris neo alkalanate titanate catalyst did not show any peak at both wavelengths responsible for phenolic OH absortion. It should be noted that the catalysts were used in amounts in the range of 10 to 15 times of what is needed according to the invention. Even with such concentrations of catalyst in the starting mixtures, the product obtained by using tetra isopropyl titanate as a catalyst did exhibit absorption of phenolic groups.

OTHER COMPARATIVE EXAMPLES

A solution of 7.5 g of ®Xylok and 7.5 g of silicone resin and no catalyst, respectively 2 g of nonaloxy zirconate as a catalyst, was mixed for two and four hours.

The product was examined by ultra violet spectrophotometry after the addition of a small amount of KOH in order to ionise the phenolic groups (see Table 5).

The ionised phenolic groups show absorption at 280 and 275 mm.

When reaction occurs between ®Xylok and silicone, no ionised phenolic groups appear after addition of KOH.

TABLE 5

|  | reaction time | | | |
|---|---|---|---|---|
|  | 2 hours | | 4 hours | |
| Catalyst | Abs 280 nm | Abs 275 nm | Abs 280 nm | Abs 275 nm |
| no catalyst | 1.2 | 1.3 | 1.2 | 1.3 |
| nonaloxy zirconate | 1.2 | 1.2 | 1.3 | 1.3 |

The use of nonaloxy zirconate leads to results comparable to those obtained without a catalyst and both yields to products having a substantial amount of remaining free phenolic groups.

What is claimed is:

1. A polymeric composition for friction elements, comprising a co-polymer between (I) a resin containing phenolic groups, (II) an organopolysiloxane resin containing terminal silanol groups, whereby the reaction between the phenolic groups and the terminal silanol groups is substantially complete, wherein tris neoalkalanate titanate is used as a catalyst for the co-polymerisation reaction.

2. A polymeric composition according to claim 1, wherein the resin comprising phenolic group comprises also terminal non aromatic alcoholic groups.

3. A polymeric composition according to claim 1, in which the resin (I) containing phenolic groups is of general formula (A) and may include moieties of the general formula (A'):

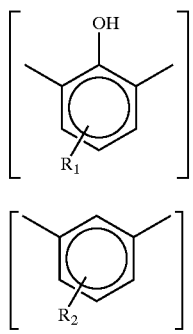

wherein each of $R_1$ and $R_2$ is H, Akyl, or —$CH_2OH$.

4. A polymeric composition according to claim 3, wherein the resin comprising phenolic group is a phenyl aralkyl resin having a basic structure of alternated moieties A/A'.

5. A polymeric composition according to claim 1, in which the resin containing phenolic groups is from 50 to 80% and the organopolysiloxane resin containing terminal silanol groups is from 8 to 25% by weight of the total starting mixture.

6. A polymeric composition according to claim 1, in which the organopolysiloxane resin containing terminal silanol groups is a diphenyl silicone or a hydroxy phenyl alkyl silicone resin.

7. A polymeric composition according to claim 1, further including a reticulation agent which is hexamine.

8. A polymeric composition according to claim 1, in which the catalyst is neopentyl(diallyl)oxy trineodecanonyl titanate.

9. A process of preparation of a polymeric composition, comprising the following steps:
   a) mixing and kneading together (I) a resin containing phenolic groups with (II) a resin containing terminal silanol groups, in the presence of a tris neoalkanate titanate as a catalyst, for a period of time sufficient to substantially complete the reaction between the phenolic groups and the terminal silanol groups, to yield a paste,
   b) cooling down the paste until obtaining a solid,
   c) grinding the solid into a powder,
   d) adding a reticulation agent to said powder,
   e) curing the above mixture,
   f) post-curing the product obtained under e).

10. A process according to claim 9, in which the tris neoalkanate titanate is used in quantities of between 1 and 2% by weight of the total mixture.

11. A process according to claim 9 in which the curing step is divided in a number of cycles permitting the degassing of the reaction mixture.

12. A process according to claim 9 in which the starting resins are in a form of powder with a particle size distribution of not more than 400 μm.

13. The polymeric composition of claim 1 as a binder for brake pads.

14. A polymeric composition according to claim 2, in which the resin (I) containing phenolic groups is of general formula (A) and may include moieties of the general formula (A'):

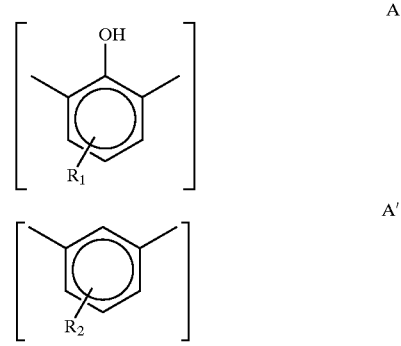

wherein each of $R_1$ and $R_2$ is H, Akyl, or —$CH_2OH$.

15. A polymeric composition according to claim 14, wherein resin comprising phenolic group is a phenyl aralkyl resin having a basic structure of alternated moieties A/A'.

16. A process according to claim 10 in which the curing step is divided in a number of cycles permitting the degassing of the reaction mixture.

17. A process according to claim 10 in which the starting resins are in a form of powder with a particle size distribution of not more than 400 μm.

18. The polymeric composition of claim 2 as a binder for brake pads.

19. The polymeric composition of claim 3 as a binder for brake pads.

20. The polymeric composition of claim 4 as a binder for brake pads.

* * * * *